US010298580B2

(12) United States Patent
Senarath et al.

(10) Patent No.: US 10,298,580 B2
(45) Date of Patent: May 21, 2019

(54) ADMISSION OF AN INDIVIDUAL SESSION IN A NETWORK

(71) Applicants:Nimal Gamini Senarath, Ottawa (CA); Sophie Vrzic, Kanata (CA); Hang Zhang, Nepean (CA); Ngoc Dung Dao, Ottawa (CA)

(72) Inventors: Nimal Gamini Senarath, Ottawa (CA); Sophie Vrzic, Kanata (CA); Hang Zhang, Nepean (CA); Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/169,097

(22) Filed: May 31, 2016

(65) Prior Publication Data

US 2016/0352734 A1    Dec. 1, 2016

Related U.S. Application Data

(60) Provisional application No. 62/169,460, filed on Jun. 1, 2015.

(51) Int. Cl.
*H04L 29/06* (2006.01)
*H04W 12/08* (2009.01)
*H04W 76/16* (2018.01)

(52) U.S. Cl.
CPC ......... *H04L 63/0892* (2013.01); *H04W 12/08* (2013.01); *H04W 76/16* (2018.02)

(58) Field of Classification Search
CPC ..... H04W 48/16; H04W 84/12; H04W 88/08; H04W 76/02; H04W 76/023;
(Continued)

(56) References Cited

U.S. PATENT DOCUMENTS

| | | | |
|---|---|---|---|
| 9,038,151 B1 | 5/2015 | Chua et al. | |
| 2007/0027956 A1* | 2/2007 | Castell | H04L 63/0227 709/206 |

(Continued)

FOREIGN PATENT DOCUMENTS

| | | |
|---|---|---|
| CN | 101262654 A | 9/2008 |
| CN | 103765386 A | 4/2014 |

(Continued)

OTHER PUBLICATIONS

International Search Report for International Application No. PCT/CN2016/084336 dated Sep. 1, 2016.

(Continued)

*Primary Examiner* — Nizar N Sivji

(57) ABSTRACT

An aspect of the disclosure provides a method for session admission at a node in an infrastructure provider network. The method includes receiving a connection request from a user equipment not associated with a network with which the infrastructure provider network is associated and obtaining from the user equipment, an identification of a service provider with which the infrastructure provider network is associated. Access authorization is then requested from the identified service provider. Embodiments allow such a process to provide government mandated free access, or for some other service provider to pay for the service.

21 Claims, 13 Drawing Sheets

(58) Field of Classification Search
CPC ... H04W 36/08; H04W 84/045; H04W 28/08; H04W 48/20; H04W 72/005; H04W 72/0406; H04W 76/025; H04W 28/20; H04W 72/044; H04W 16/32; H04W 40/30; H04W 48/08; H04W 72/04; H04W 48/02; H04W 74/00; H04L 63/08; H04L 49/25; H04L 5/0085; H04M 15/73

See application file for complete search history.

(56) References Cited

U.S. PATENT DOCUMENTS

| | | | |
|---|---|---|---|
| 2011/0112894 A1* | 5/2011 | Tan | G06Q 30/0241 705/14.4 |
| 2013/0058227 A1 | 3/2013 | Lemieux et al. | |
| 2013/0303114 A1 | 11/2013 | Ahmad et al. | |
| 2014/0086177 A1 | 3/2014 | Adjakple et al. | |
| 2015/0312845 A1* | 10/2015 | Teeni | H04W 4/021 455/411 |
| 2016/0345151 A1* | 11/2016 | Chen | H04W 48/16 |

FOREIGN PATENT DOCUMENTS

| | | |
|---|---|---|
| EP | 2866495 A2 | 4/2015 |
| WO | 2014111934 A1 | 7/2014 |

OTHER PUBLICATIONS

Extended European Search Report dated Feb. 28, 2018 for corresponding European Application No. 16802551.8 filed Jun. 1, 2016.

* cited by examiner

ADMISSION OF AN INDIVIDUAL SESSION IN A NETWORK

CROSS-REFERENCE TO RELATED APPLICATIONS

This application claims priority to U.S. Provisional Application Ser. No. 62/169,460 filed Jun. 1, 2015, the contents of which are hereby incorporated by reference.

TECHNICAL FIELD

This disclosure relates to the process of admitting a user session to a network.

BACKGROUND

In mobile networks, including $3^{rd}$ Generation (3G) networks and $4^{th}$ Generation (4G) networks such as those compliant with the Long Term Evolution (LIE) standards, network operators provide service to end users through the use of network functions that enable a variety of different network services, and own the physical infrastructure on which the network operates. Because the operator owns the network access infrastructure it is able to perform Authentication Authorization and Accounting (AAA) procedures when a User Equipment (UE) attaches to the network.

Mobile Virtual Network Operators (MVNO) provide services to subscribers using the network services provided by and infrastructure owned by a network operator (also referred to as a service provider). Typically, the MVNO provides AAA information to the network operator, so that an MVNO customer can be authenticated and authorized for access when a UE attaches to a network access point. Some MVNOs have relationships with more than one service provider. This allows the MVNO to take advantage of the coverage maps of multiple providers. The MVNO may be able to create a broader coverage area where the service provider maps are non-overlapping, and to allow deeper coverage where the service areas overlap. The manner in which a network operator treats traffic associated with an MVNO is typically governed by a Service Level Agreement (SLA).

As designs for next generation networks, including so-called fifth generation (5G) networks, evolve, it is increasingly clear that there is interest in using resource sharing techniques from other networking fields including Network Functions Virtualization (NFV), which may be managed by a MANagement and Orchestration architectural framework (MANO) to allow a Service Provider (SP) to provide a virtual network (VN) to customers. By using virtualized infra-structure the provided VN can be customized to suit the needs of the customer.

These VNs may allow a UE to attach to physical infrastructure that is owned by a SP. Because a UE may not always be in an area served by the SP with whom the VN has an arrangement, there may arise a need for a SP to admit UEs for which the SP does not have AAA data.

SUMMARY

An aspect of the disclosure provides a method of obtaining access to network resources for a mobile device. Such a method includes receiving a request, at an authentication and authorization function (AAF) from a Radio Access Network (RAN) device, for access for a mobile device. Such a method includes responsive to failing authorization to access any of a plurality of virtual networks, authorizing at the AAF, the mobile device to access a limited access service. In some embodiments, the method can include authenticating, at the AAF, the mobile device. In some embodiments the plurality of virtual networks is established through a plurality of core networks each connected to the RAN. In some embodiments the RAN is connected to a core network, and the plurality of virtual networks are established through the core network. In some embodiments the method is executed by an AAF of the RAN network. In some embodiments the method can further include receiving an indication of a preferred virtual network from the mobile device. In some embodiments the method can further include transmitting a list of virtual networks to the mobile device. In some embodiments the method is executed by an AAF of the core network. In some embodiments the plurality of virtual networks are established through a network architecture. Such a network architecture can include an infrastructure provider (InP) for providing RAN infrastructure; and a plurality of telecommunications connectivity service providers (TCSPs) with each TCSP associated with at least one virtual network operator (VNO), wherein a VNO supplies virtual network services to subscribing customers using a virtual network established by a TCSP. Alternatively, such a network architecture can include an InP, a TCSP and a plurality of VNOs, wherein each of the VNOs supplies virtual network services to subscribing customers using a virtual network established by the TCSP. In some embodiments authenticating includes requesting and/or receiving authentication from a different entity, which can be a third party server. In some embodiments authorizing the mobile device to access a limited access service comprises requesting authorization for the mobile device to access a limited access. In some embodiments requesting authorization for the mobile device to access a limited access service comprises transmitting a request to 3rd party server. In some embodiments the method further includes, in response to the request being a request for an emergency access service, granting access to the emergency access service; and wherein the limited access service is a non-emergency limited access service.

Another aspect of the disclosure provides a method of obtaining authorization for access to network resources for a mobile device in a RAN in a network architecture including the RAN having a first administrative domain, and a VN implemented using a core network having a second administrative domain. Such a method includes receiving, at an AAF, a request for access for a mobile device. Such a method further includes responsive to failing authorization to access the VN, authorizing, at the AAF, the mobile device to access a limited access service supplied by the core network having the second administrative domain. In some embodiments such a method further includes authenticating, at the AAF, the mobile device. In some embodiments authenticating includes requesting and/or receiving authentication from a different entity, which can be a third party server. In some embodiments the method is executed by AAF of the RAN. In some embodiments responsive to failing authorization to access the VN, authorizing the mobile device to access a limited access service comprises transmitting a request to an AAF of the core network, and receiving a reply from AAF function of the core network. In some embodiments the method is executed by an authentication and authorization function (AAF) of the core network. In some embodiments responsive to failing authorization to access the VN, authorizing the mobile device to access a limited access service includes failing to authorize the mobile device for network access according to a subscriber database of the AAF; requesting authorization from a blacklist authorization function; and transmitting an authorization message to the RAN.

Another aspect of the disclosure provides a method of providing a 3rd party offered service via a TCSP, the method performed by a 3rd party server. Such a method includes receiving a request from the TCSP for a session on behalf of a user without a subscription to a network associated with the TCSP. Such a method further includes authorizing the user. Such a method further includes transmitting an authorizing response to the TCSP and providing the 3rd party service. In some embodiments the method further includes transmitting a message to the TCSP indicating the 3rd party agrees to pay for connection charges. In some embodiments the method further includes negotiating with the TCSP for specific connection parameters for the session.

Another aspect of the disclosure provides a node including a processor and machine readable memory storing machine executable instructions for implementing an authentication and authorization function (AAF). The machine readable memory includes instructions which cause the AAF to receive a request, from a Radio Access Network (RAN) device, for access for a mobile device. The instructions further cause the AAF to, responsive to failing authorization to access any of a plurality of virtual networks, authorize the mobile device to access a limited access service. In some embodiments the instructions further cause the AAF to authenticate the mobile device. In some embodiments the instructions further cause the AAF to implement other method steps described herein.

Another aspect of the disclosure provides a node for use in a network, the network including a RAN having a first administrative domain and a VN implemented using a core network having a second administrative domain. Such a node includes a processor and machine readable memory storing machine executable instructions for implementing an AAF. The machine readable memory includes instructions which cause the AAF to receive a request for access for a mobile device. The instructions further cause the AAF to, responsive to failing authorization to access the VN, authorizing the mobile device to access a limited access service supplied by the core network having the second administrative domain. In some embodiments the instructions further cause the AAF to authenticate the mobile device. In some embodiments the instructions further cause the AAF to implement other method steps described herein.

A further aspect of the disclosure provides a method for session admission at a node in an infrastructure provider network. The method includes receiving a connection request from a user equipment not associated with a network with which the infrastructure provider network is associated and obtaining from the user equipment, an identification of a service provider with which the infrastructure provider network is associated. Access authorization is then requested from the identified service provider.

Embodiments allow such a process to provide government mandated free access, or for some other service provider to pay for the service.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description which illustrate and describe embodiments by way of non-limiting examples, wherein like reference numerals represent like parts.

DESCRIPTION OF EMBODIMENTS

In current mobile networks, any device that can attach to a network provided the ability to access emergency services (e.g. 911 or 112). In future network architectures, devices may be provided access to non-emergency data services. These services may be limited in scope, but may be provided by entities other than those that own the network access points (APs) and other infrastructure. In one example embodiment, a UE without a subscription may be provided limited internet access to allow the user to acquire service from a VNO. In other embodiments, the user may be provided access to a limited variety of content made available through agreements with the content suppliers.

Further, there may be requirements for the provision of non-emergency services. There may be requirements for UEs to be provided access to a set of data services without subscription. Aspects of this disclosure provide methods and systems for allowing a network to admit a session where the corresponding user does not have a subscription.

Figure 1:
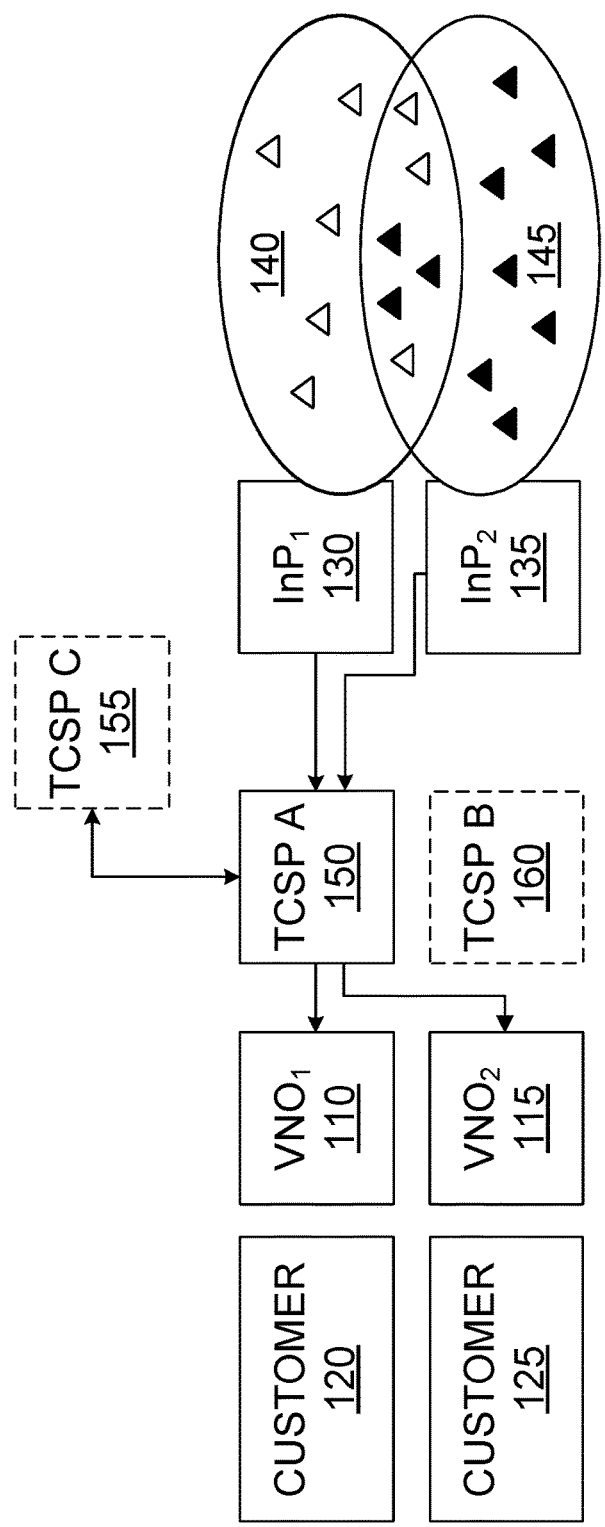
FIG. 1 is a block diagram illustrating a possible network structure.

An example network will be discussed before providing details of subscriptionless session admission mechanisms. In current network architectures, a service provider is a single entity which provides telecommunications services to an end user population using infrastructure that it owns (or has long term leasing arrangements for). FIG. 1 is a diagram illustrating a network architecture in which the ownership and management of infrastructure, the provision of telecommunication services and the customer facing role are decoupled. Some or all of this decoupling may be present in next generation networks. In the illustrated architecture, each of the different functional roles may be served by different entities. In some scenarios, a single entity may act in more than one functional role. One such entity is a virtual network operator (VNO), which provides mobile network access to customers (e.g. UEs). A VNO may alternately be referred to as an MVNO. Another entity is an infrastructure provider (InP) which owns network infrastructure such as network access points for providing network access (e.g. base stations, eNodeBs, WiFi APs etc.), compute and storage resources (such as those provided by a data center) and other connectivity resources including wired and wireless backhaul connections. Another entity is a Telecommunications Connectivity Service Provider (TCSP) which aggregates resources to provide telecommunication services to the customers of a VNO. A TCSP may alternately be referred to as a network operator (NO).

In the illustrated architecture of FIG. 1, two InPs, $InP_1$ 130 and $InP_2$ 135, provide network access infrastructure. $InP_1$ 130 has coverage area 140, and $InP_2$ 135 has coverage area 145. Each InP has network access infrastructure such as access points (APs), with the APs in black associated with $InP_2$ 135 and the APs in white associated with $InP_1$ 130. TCSP A 150 obtains a portion of the connectivity resources of $InP_1$ 130 and $InP_2$ 135. In some embodiments, an InP will make use of network slicing to provide a TCSP with a virtualized set of access resources that the TCSP can have varying degrees of control over. TCSP A 150 uses the connectivity resources obtained from $InP_1$ 130 and $InP_2$ 135, along with other functions that can be provided atop of other network resources, to supply connectivity services to various VNOs (also called Virtual Network Customers (VNCs)). First and second VNOs ($VNO_1$ 110 and $VNO_2$ 115) acquire networking services from TCSP A 150 in order to provide services to their respective end user populations. Each VNO 110, 115 has its own end user population, each collectively designated respectively as Customer 1 120 and Customer 2 125. Other embodiments may comprise additional TCSPs, such as TCSP B 160 and TCSP C 155, which TCSP A 150 may utilize in order to provide end-to-end communication paths. Further, those having ordinary skill in this art will appreciate that there is not a one-to-one correspondence between InPs 130, 135 and VNOs 110, 115, despite the fact that the diagram illustrates two of each. Any number of both InPs and VNOs can be supported.

The end user populations may comprise, by way of non-limiting example, devices associated with one or more of an alarm company, a sensor company, a police department, a fire department, an e-health monitoring service and any combination of any of these. Each of these customer groups can contract with particular VNOs for virtual network (VN) services for their users/devices. Alternatively, a VNO 110, 115 may simply offer services to individual customers that subscribe to its services.

Each VNO may be considered to be a consumer of the resources of a TCSP. The resources required by a virtual network may in some embodiments depend upon the type and function of the virtual network.

In providing service to a VNO, a service provider (e.g., a TCSP) may engage additional InPs so that it can provide services to the VNO required by the SLA. In one scenario, additional InPs may be engaged to expand the coverage area available to the VNO. In another scenario, additional InPs may be engaged to enhance the coverage in a heavily used region. The TCSP can aggregate the resources of a plurality of InPs to create a network includes both connectivity resources and compute and storage resources. The TCSP's use of a plurality of InPs is not visible to the VNO.

In such a decoupled architecture, different entities operate different administrative domains. For the example illustrated in FIG. 1, each VNO, TCSP, and InP operates its own administrative domain.

In such a network architecture, the VNO's include customer facing functions for selling services to customers, which can be groups or individual subscribers. The TCSP provides the connectivity services to the VNO which are used to support the VNO customers. In some embodiments, the TCSP allocates services in such a manner as to make it appear as if the VNO has its own virtual network. In some embodiments, the TCSP provides each VNO a separate network slice. This allows the traffic for each VNO to be isolated from that of other VNOs. In some embodiments, a TCSP may also operate as an Infrastructure Providers (InPs) (although in such a scenario, the infrastructure resources may be dedicated to the TCSP and unavailable to other TCSPs).

Even when a TCSP has access to the resources of its own InP, it may be beneficial for it to have access to the resources of other InPs. In one example, an InP may be the owner of an office building. In the office building, a series of network access points, also referred to as small cells or picocells in the LTE context, may be deployed. Instead of each TCSP deploying their own set of access points, the InP can make its access network available to a plurality of different TCSPs. A TCSP that owns its own infrastructure may still benefit from access to the InP's resources so that it can have better network coverage in the office building. In other scenarios, subway operators may create their own InPs to sell access to deployed APs in stations and subway tunnels, thus creating a network that can provide coverage in areas that are often poorly served by conventional mobile network deployments.

As noted above, it is possible for a TCSP to also operate as an InP. Similarly, it is possible for a TCSP to operate as a VNO. The VNO would likely have a service region defined exclusively by the TCSP, but the operation of the TCSP would also allow for other VNs to be admitted atop the TCSP resources.

The resources allocated to a particular VN may be statically allocated, or they can be varied along with demand in a dynamic fashion. The underlying physical resources can be allocated using either hard or soft slices so that the underlying physical resources can be statically committed or dynamically committed respectively.

Network slicing is a network management technique that allows for a portion of a pool of resources (both infrastructure and network functions) to be grouped together into a sub-network with at least limited amounts of network control and traffic isolation. A single network slice can be created atop a set of resources (whether physical or virtual). Each network slice can operate as a substantially separate network. The capabilities and operating parameters of each network slice may be customized. Resources are allocated to the slice. The allocated resources can be increased or decreased, which allows for the geographic scope of a slice to be modified and which allows for the resources allocated to the slice at a particular location to change as well. Configuration of a network slice may be based on software defined networking (SDN) and executed by SDN Controllers. A management plane inside the slice may make use of standardized network orchestration functions to communicate with other slices or with the controllers that govern slice management and configuration. Inside a slice, network function virtualization may be employed to create network functions needed within the slice. These Virtual Network Functions (VNFs) can then be connected to each other within the slice through the use of logical links. By varying the characteristics of either the logical links or the resources allocated to a VNF, the dynamic needs of a network can be accommodated. To any entity within the slice, or to traffic flows within the slice, the slice is a complete network that is indistinguishable from a physical network.

While in 3G/4G networks, provisions are made to allow access to emergency services to devices that do not have subscriptions to a network, there is increased interest in ensuring that future networks have the ability to provide at least limited access to devices without subscriptions. In some scenarios, there may be regulatory requirements to provide non-subscribing devices with access to some data services (e.g. for services identified as basic services such as access to data-based emergency services and other emergency alerts), as well as business opportunities that may benefit from providing limited access rights. In some scenarios, a mobile device, such as a UE that connects without a subscription, can be provided limited data access so that it can register for service. In another scenario access to a particular content provider may be allowed. Where access to a particular content provider is permitted, the content provider may have arranged to pay for the use of the network resources so that mobile device users can pay for content. Similarly, a search engine, or some other service may arrange for access for UEs that do not have a subscription. As another example, an on-demand Single Session Admission (SSA), which is typically for a one time admission, may be allowed for a device which has previously negotiated an earlier SSA with a TCSP.

Basic Services may also be referred to as Basic Access Services (BAS) or limited access services. The provision of BAS to a UE with limited access to a network will be described. Limited access to the network may entail access that is restricted to a set of services or sites, and it may further entail restrictions on the amount of data transmitted (either as a cap on a data rate, or as a cap on the quantity of data transmitted). Embodiments include providing access to a non-emergency limited access service.

In this discussion of admission of a session for UE's without subscriptions, it should be understood that with reference to FIG. 1, a UE will be subscribed to a VNO, but will connect to an InP. InPs and VNOs both have relationships with TCSPs, and may not be associated with each other. The mechanisms by which an InP will determine that a UE has a subscription (to a VNO associated with a TCSP that is also associated with the InP) are the subject to a co-pending application. A UE that is not recognized by an InP as being associated with a VNO is classified as a UE without a subscription. This designation can include UEs that do not have a subscription to any network, or that do not have a subscription to an associated network.

Figure 2:
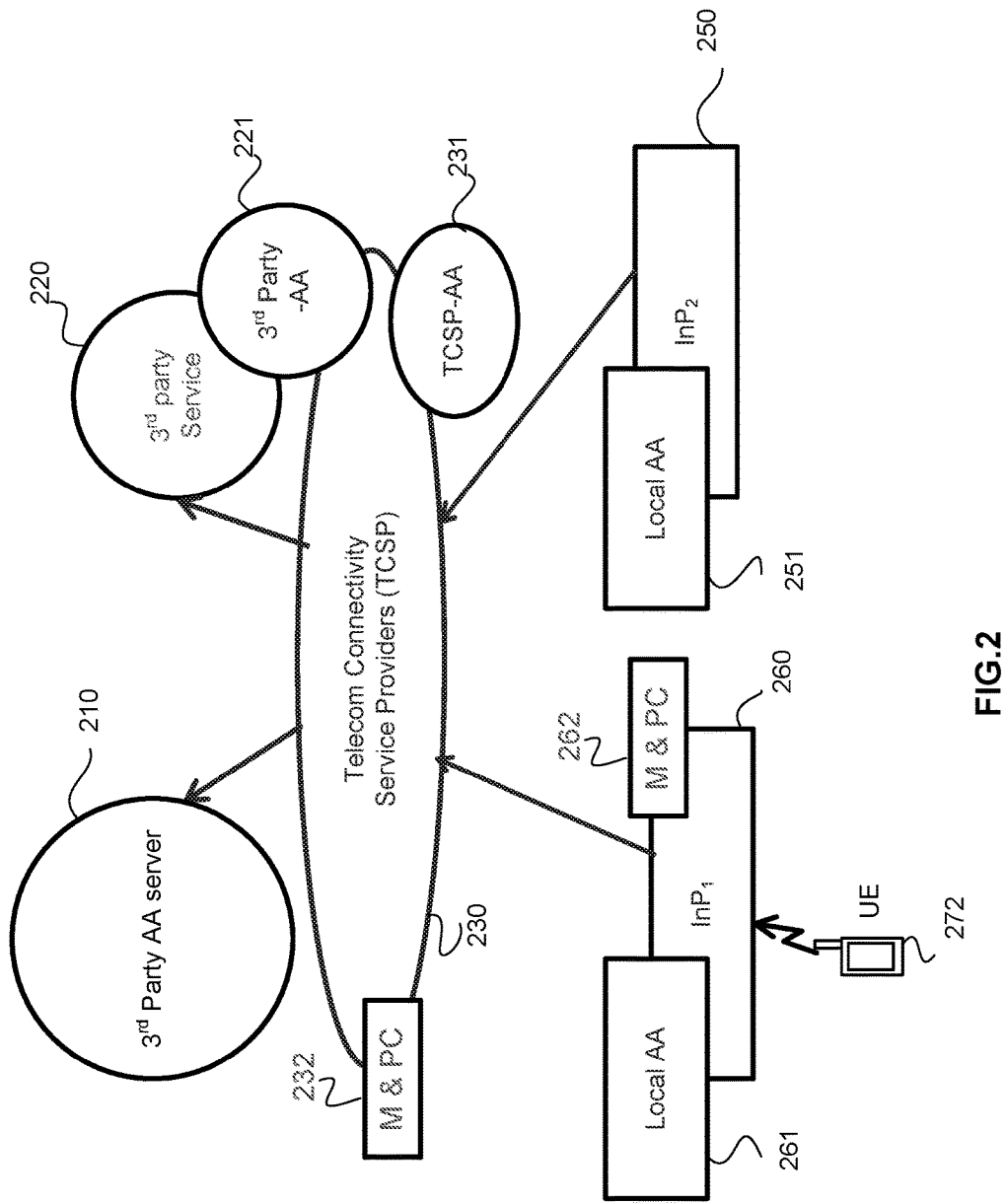
FIG. 2 illustrates a network architecture, according to an embodiment.

FIG. 2 illustrates a network architecture, according to an embodiment. The network architecture of FIG. 2 is similar to that of FIG. 1. An Infrastructure Provider (InP) such as $InP_1$ 260 and $InP_2$ 250 will include access points (not shown) and provide resources for radio network access. A Telecom Connectivity Service Provider (TCSP) 230 provides services on top of the physical resources obtained from an InP. The TCSP provides these services to a VNO to enable mobile network services to be offered to end users.

Authentication, Authorization and Accounting (AAA) servers are known in the art and the services that they provide have been defined by the 3GPP. Authentication is the process of validating identity information associated with a UE, to ensure that a UE is the device that it is represented as being. Authorization is a process of determining whether a UE has access rights to a resource. In some embodiments discussed herein, authorization can be used to confirm a user/device is not blocked (black-listed) from accessing a network resource (e.g. for previous abusive behaviors). Authorization may be used to determine whether a UE can be used to access some or all of the resources of a particular network slice. Accounting relates to the procedure for charging the entity for the service.

Embodiments will be discussed with reference to Authentication and Authorization functions (AAFs). An AAF will be understood to those skilled in the art to provide Authorization and Authentication (AA) services, such as those that would be provided by a 3GPP compliant (AAA) function. The omission of the Accounting function from the AAF should not be construed as a requirement that it not be present, but instead an understanding that accounting functions may be provided elsewhere, although they could be provided in the AAF. Where the 3GPP AAA function views authentication as the determination that a device presenting an identifier is the device associated with the identifier (the device is who it claims to be), it should be understood that in some embodiments of the AA function, authentication may involve user authentication in place of authentication of the UE.

TCSP 230 can also include an AAF TCSP-AA 231 configured to provide AA services for the TCSP 230 (either for itself, or on behalf of a VN). Further, each InP can include its own local AAF 251, 261 for providing AA services to the respective InP ($InP_1$ 250 and $InP_2$ 260). A TCSP may offer AA services to a hosted VN in different ways. In a first embodiment, the VN is able to make use of a virtualized AA template so that the VNO can instantiate an AAF so that it has full control over AA functions. Because a VNO is not directly associated to the different InPs through which the UEs connect, all AA requests would be sent from the InP to the TCSP and then the VNO. To reduce some of the latency involved, a TCSP may create its own AA functions. These functions could serve to cache AA information from the various VNOs. This would allow a TCSP hosted AAF to reduce traffic flows between the InP and VNO AA functions by providing an intermediate location in which AA services can be provided. The TCSP, under certain agreements, may also be able to push AA information down to AA instantiations in a network operated by the InP, or into InP instantiated AA functions in the access nodes. Typically, the AA information hosted by AA instantiations in the InP is associated with UEs that have already been authenticated once by that InP.

In addition to AA, Monitoring and Policy control (M&PC) functions such as traffic Monitoring (M) and Policy Control (PC) may also be instantiated by both the InP and TCSP. For example $InP_1$ 260 is shown to include M&PC function 262, and TCSP 230 is shown to include M&PC function 232. M&PC can also include Admission Control (AC) and Traffic Control (TC) functions. These functions may be split up and administered by different entities, possibly in different administrative domains. The AA function can be subdivided, with in some embodiments, each of Authorization, Authentication and Accounting being carried out by functions that may not reside within the same administrative domain. By allowing each piece of the AA function to be carried out in different VNFs, each piece can be individually controlled and moved to different physical locations, or move to different administrative domains in the network. When a UE attaches to an AP, the AP may perform an admission check, which can include authentication, authorization and admission control procedures. These procedures are not necessarily performed by the same function. Admission control procedures allow network entities to determine that there are sufficient available network resources prior to admitting the UE. When at UE initiates a connection request, the UE may be both authenticated and authorized, but the session may be rejected due to a lack of available resources.

In some embodiments a TCSP can allocate a pool of resources for basic services, and admission control can limit sessions based on remaining capacity of such a pool of resources. In other embodiments, a TCSP can establish a basic service slice, and admission control can depend on remaining capacity of such a basic service slice.

As illustrated in FIG. 2, the TCSP 230 and InP₁ 260 both include an instance of an M&PC function 232 and 262 respectively. The M&PC function may not be instantiated in an InP, and in such an event the TCSP is responsible for M&PC functions. This is illustrated by InP₂ not having an M&PC function. By delegating M&PC responsibility to M&PC function instances in InP₁ 260, TCSP 230 is able to have traffic monitored and policies enforced at the InP level, so that excess traffic may be curtailed as close to the source as possible. Those skilled in the art will appreciate that M&PC 262 may carry out a subset of the functions performed by M&PC 232.

When a UE attaches to an AP, it is connecting to a network element that is a part of the InP. The AP may have access to a local AA function that can carry out some or all of the AAA functions. If the local AA function does not have the ability to either authenticate or reject the authentication request, a AA request can be forwarded from the local AA to the TCSP hosted AA service. If the TCSP hosted AA service can either authenticate the UE or reject the authentication request, it can provide the AA response to the InP, and the UE connection request can be accepted or rejected. If the TCSP determines that the UE is associated with a particular VNO, and the TCSP does not have a guarantee that it already hosts the most up to date AA information for the VNO, then it may pass the request to the VNO. From the perspective of a node in the InP, the TCSP will either provide authentication or indicate that authentication failed. The InP does not need to concern itself with whether the TCSP has contacted a VNO. When neither the InP nor the TCSP can get either authentication or authorization, the UE is considered to be a UE without a subscription. Instead of simply rejecting UEs that are not authorized for network access, in some scenarios, it may be beneficial (or even required) to provide basic access services.

The admission of an individual Session by an InP where the UE is not associated with the InP or TCSP (e.g. the UE cannot be authorized for access to a VNO associated with any TCSP that the InP is associated with), will now be briefly discussed with relation to FIG. 2. In this scenario, the TCSP 230 has an existing relationship with the InP (e.g., InP₁ 260 or InP₂ 250). As part of a transmitted connection request, UE-supplied credentials are provided to the AP. These credentials are used by the AA function. As noted above, the credentials for a UE without a subscription will result in an Authorization failure.

When a UE without a subscription attempts to connect, it will not be able to obtain authorization from a standard AAA process. If the UE is to be provided access to some resources (e.g. limited data access including access to a slice that would permit the UE to select a subscription, or limited data access including access to a restricted set of services) it may be desirable for some sort of authorization process to be carried out to avoid possibly abusive behavior. FIG. 2 further illustrates a $3^{rd}$ Party AA server 221 which can be utilized by the TCSP 230 to ensure that the UE 272 is authorized to access the limited services. Authorization as a precondition for access to limited services allows for verification that the UE has not been previously identified with abusive behavior. One mechanism for carrying out a lightweight authorization process is for the use of a so-called black-list for the limited services. The black-list can be used to track UEs, or possibly identity information associated with users, that have previously engaged in abusive behavior (e.g. violation of terms of service or engaging in denial of service attacks, etc.). FIG. 2 further illustrates the TCSP 230 in communication with a $3^{rd}$ party service 220. This $3^{rd}$ party service 270 may be associated with the $3^{rd}$ Party AA server 221, and in some embodiments may be the only pathway for TCSP 230 to access the $3^{rd}$ party AA 221. $3^{rd}$ Party service 220 may represent the limited access service provided to UE 272 upon authentication using $3^{rd}$ Party AA 221. It will be understood that access to a $3^{rd}$ party service 220 may require both authorization checks and admission control processes to determine that there are sufficient resources to support the connection. For example, if an InP or TCSP has traffic loads in excess of a threshold, the UE connection request will be rejected.

The limited access services, such as access to $3^{rd}$ party service 220, may be implemented within a distinct network slice of the TCSP network. The AA process used to authorize UE 272 to access the $3^{rd}$ party service 220 may include instructions for the UE to transmit an attach request with slice specific identifiers.

The services offered within $3^{rd}$ party service 220 can vary between embodiments. In some embodiments, government mandated services can be provided. Some examples of services that may be mandated by a government may include access to emergency services, traffic alerts, weather warnings etc. In other embodiments $3^{rd}$ party services may be provided by entities such as content providers, such as streaming video providers, and other on-line services. Content from a content provider may result in charges that may be covered by the content provider. Any number of other services can be supported.

Figure 3:
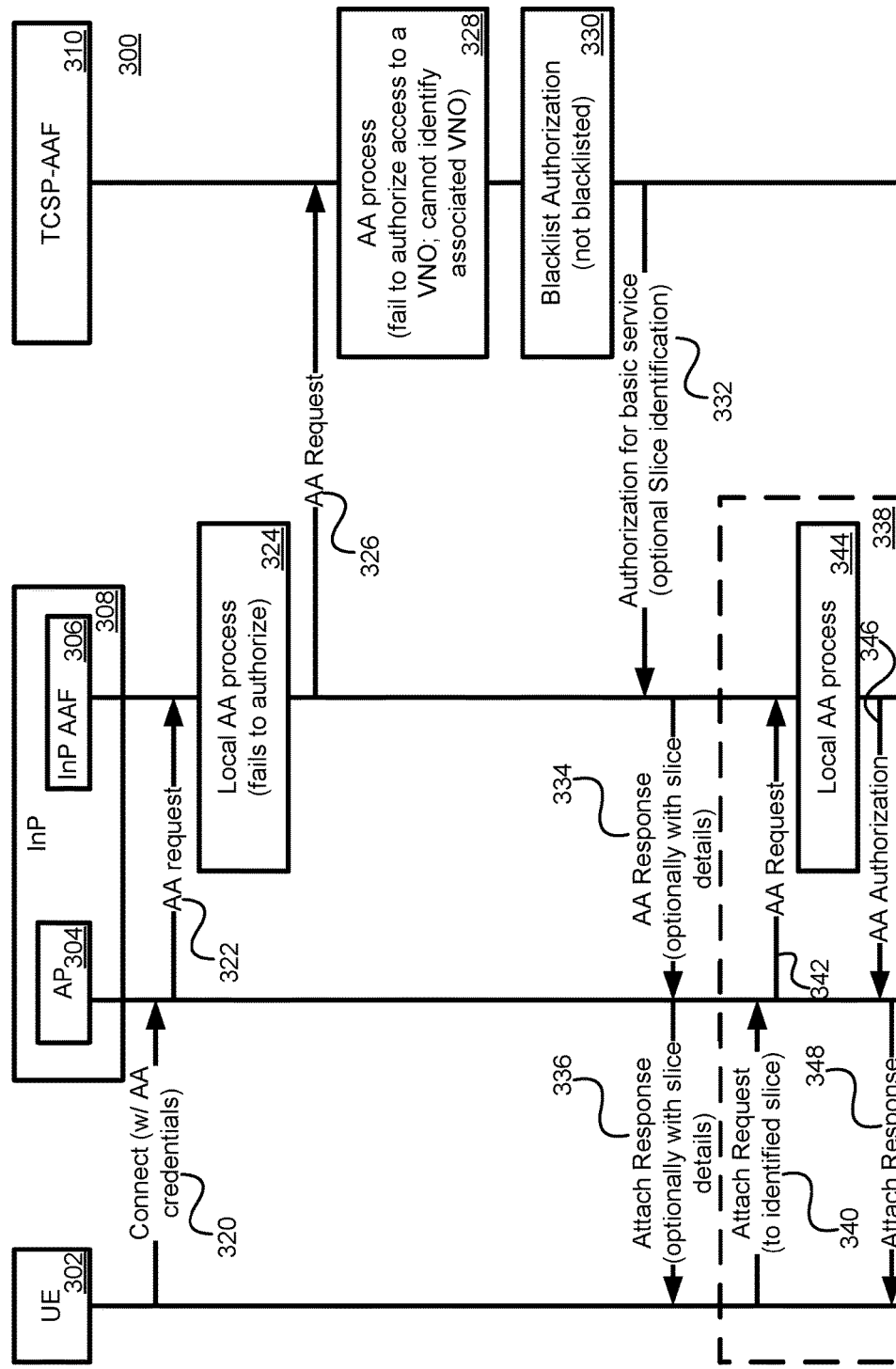
FIG. 3 illustrates a call flow according to an embodiment.

FIG. 3 is a call flow diagram illustrating the interaction 300 of a UE 302, an AP 304 and InP AAF 306 which reside within an InP network 308, and a TCSP AAF 310, to carry out some of the functions described above. In this example, it is assumed that InP 308 does not have a guarantee that the contents of its an AAF function 306 are a complete mirror of those of the TCSP AAF 310, and that the InP 308 only serves a single TCSP. The UE 302 transmits a connect message 320 to AP 304. The connect message may include AA credentials, which allow at least one of authentication and authorization functions to be performed. The AP 304 transmits AA request 332 to local InP AAF 306. InP AAF 306 performs an AA process 324. The authentication component of the AA process 324 can be successfully performed, but the authorization component fails. Details on how the process 324 can be carried out without Authentication credentials will be discussed below with reference to FIG. 7. Because the InP AAF 306 cannot obtain authorization for access to network resources for UE 302, it transmits AA request 326 to the TCSP AAF 310. AA request 326 may simply be a forwarding of AA request 322. In step 328, TCSP-AAF 310 is able to authenticate the UE 302, but is unable to obtain authorization or to identify a VNO that UE 302 is associated with. As a result of the authorization failure, TCSP-AAAF 310 performs a blacklist based authorization in step 330. As noted with respect to FIG. 2, this may be performed by a TCSP-AAF elsewhere in the TCSP network (at the request of the TCSP-AAF 310) or by a third party AAA function. Blacklist based authorization is used to identify UEs that have a past history of abusive behaviors. If UE 302 has no such history, it is authorized for access to basic services. TCSP-AAF 310 transmits an authorization message 332 to the InP AAF 306. This message 332 may specify that the authorization is for access to basic services (or a third party service as the case may be). If the basic service is provided through a particular network slice, the slice identifiers can be included in message 332. InP AAF 306 transmits an AA response 334 to AP 304. AA Response 334 may optionally include a slice identifier. AP 304 can then transmit an Attach Response 336 which may include a slice identifier. The attach response 336 may direct the UE 302 to connect to a specific slice. If this is the case, a slice attachment process 338 is carried out, in which UE 302 transmits an attach request 340 that specifies the provided slice identifier. The Ap 304 transmits an AA request 342 for authorization to access the resources associated with the specified slice. A local AA process 334 provides confirmation of the authorization. The InP AAF 306 transmits AA authorization to the AP 304, which in turn provides an attach response 348 to the UE 203.

Figure 4:
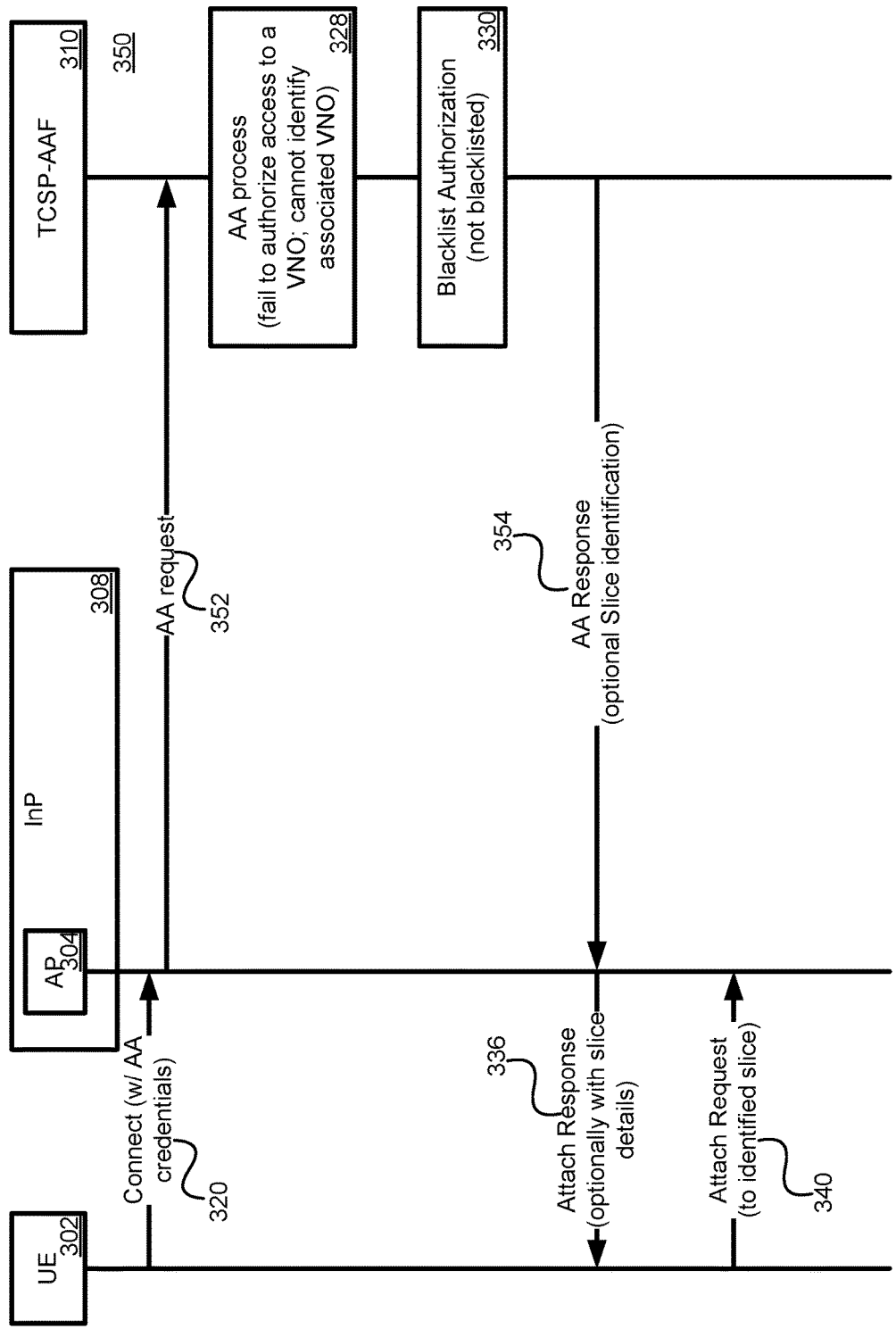
FIG. 4 illustrates a call flow according to another embodiment.

FIG. 4 illustrates a call flow for a scenario similar to that of FIG. 3, but where the InP 308 does not have an AA function, but is still associated with a single TCSP. As in FIG. 3, the UE 302 transmits a connection request 320 which includes AA credentials. The AP 304 transmits AA request 352 to TCSP AAF 310. AA request 352 may be relayed through other nodes in some embodiments. In response to receipt of AA request 352, TCSP-AAF 310 carries out steps 328 and 330 as in FIG. 3. AA Response 354 is transmitted towards AP 304. Upon receipt of AA response 354, AP 304 transmits that Attach response 336 as described above. If needed, the UE transmits attach request 340 to start a slice attachment procedure.

Figure 5:
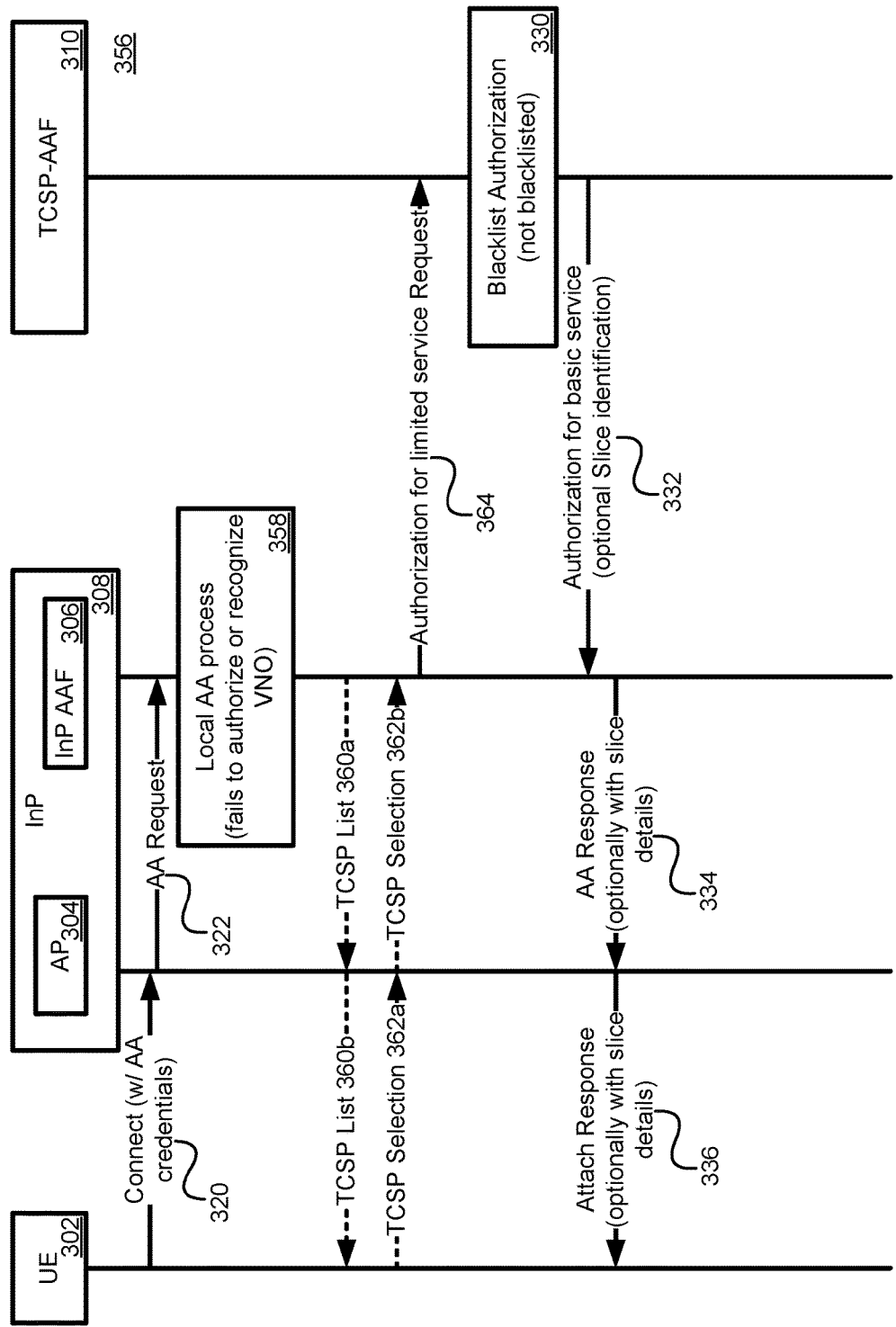
FIG. 5 illustrates a call flow according to another embodiment.

FIG. 5 illustrates a call flow for a situation in which the InP 308 has a complete AA database. As before, the UE 302 transmits connect request 320, and AP 304 transmits AA request 332. InP AAF 306 then performs its local AA process 358 and fails to authorize the UE, or recognize the VNO that the UE may be associated with. If a plurality of TCSPs is connected to the InP, the InP 308 will not know to which TCSP to connect the UE 302. InP AAF 306 then transmits a TCSP list 360 to the UE 302. Message 360 may be divided into message 360a between the InP AAF 306 and the AP 304, and message 360b between AP 304 and UE 302. The UE transmits an indication of the selected TCSP back towards the InP AAF 306 as TCSP selection 362, which may be divided into messages 362a which is sent to the AP 304 and 362b which is forwarded by AP 304 to InP AAA 306. If there is only one TCSP available messages 360 and 362 are not required (similarly, if the InP has a default TCSP selection 360 and 362 are not required). InP AAF 306 transmits a request to obtain authorization for limited service 364 to TCSP AAF 310 in the selected (or default) TCSP. Because the UE 302 has been authenticated but not authorized, and the InP AAF 306 has complete records, TCSP AAF 310 can directly proceed to step 330 as described above. Messages 332, 334 and 336 are sent as described above.

Figure 6:
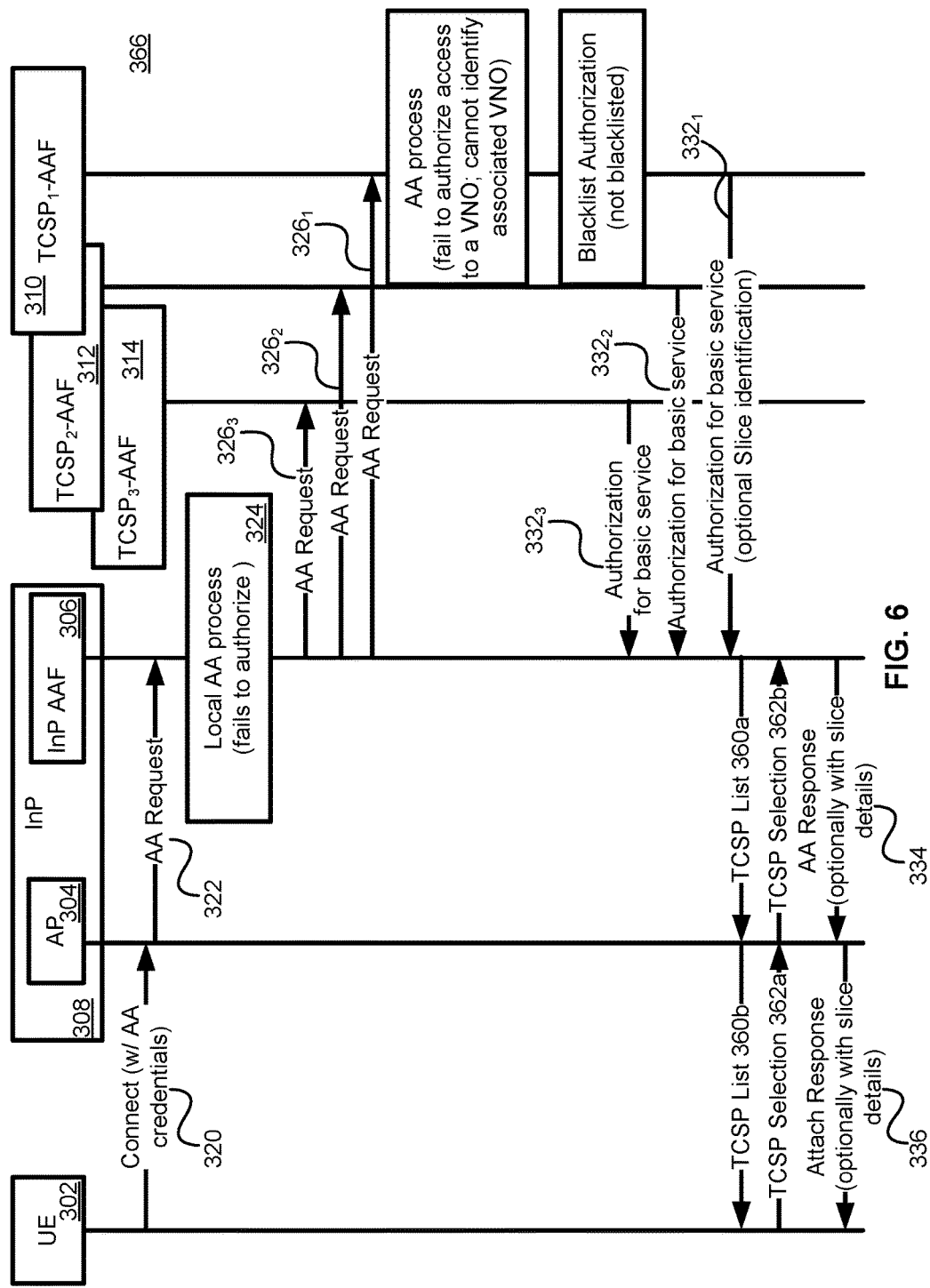
FIG. 6 illustrates a call flow according to another embodiment.

FIG. 6 illustrates a call flow for a process that involves an InP 308 without a guarantee that is has a complete AA database; and where the InP 308 is associated with a plurality of TCSPs. As with the above call flows, messages 320, and 322 are transmitted. Because the InP AAF 308 cannot determine authentication 324, does not have complete data, and works with a number of different TCSPs, the AA request 326 is transmitted to an AA server in each TCSP. Thus AA Request 326₁ is transmitted to TCSP₁ AAF 310; AA Request 326₂ is transmitted to TCSP₂ AAF 312; and AA Request 236₃ is transmitted to TCSP₃ AAF 314. Each TCSP AAF 310, 312, and 314 will carry out an AA process 328 and upon determining that the UE 302 cannot be authorized for access in process 328, a blacklist authentication process 330 is performed. Assuming that the UE 302 is not blacklisted, each TCSP AAF 310, 312, 314 transmits a message 332 providing authorization for the basic service to InP AAF 306. InP AAF 306 can provide the TCSP list 360 to UE 302. This list may include an indication of the services available through each TCSP (it should be noted that as in the above call flows, the Authorization message 332 may include a slice identifier. Each TCSP AAF 310 312 314 may include a plurality of different slice identifiers if the TCSP has a plurality of different basic/$3^{rd}$ party services to provide. The UE 302 can then transmit a TCSP selection 362. This selection may include a selection of both a TCSP, and if there is a plurality of slices associated with the TCSP, the selected slice. The AA response 334 and Attach Response 336 are then transmitted as discussed above.

Figure 7:
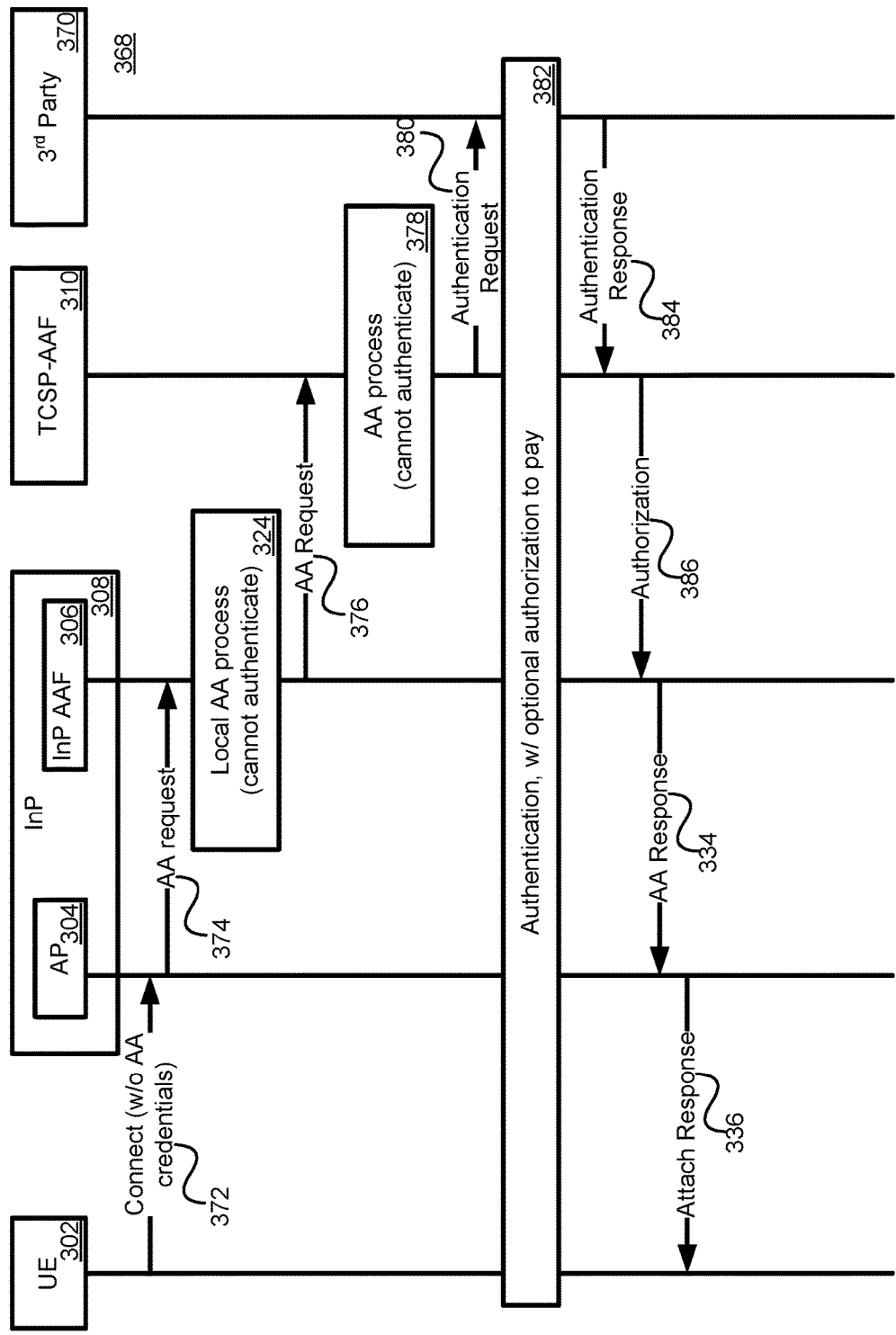
FIG. 7 illustrates a call flow according to another embodiment.

FIG. 7 illustrates a call flow in which authentication is performed by a third party 370. This $3^{rd}$ party authentication process maybe combined with a $3^{rd}$ party authorization or it can be used with the authorization options discussed above. A UE 302 sends connect message 372 with no authentication credentials, through a radio access network connection, to an Access Point AP 304. Because message 372 has no authentication credentials, UE 302 cannot be associated with any authorization to access resources. An AA request 374 is transmitted to InP AAF 306. Without authentication credentials, the local AA process 324 cannot authenticate UE 302 and AA request 376 is sent to the TCSP AAF 310. Again the AA process 378 cannot authenticate UE 302. As a result the TCSP AAF 310 transmits an authentication request 380 to a third party 370. The $3^{rd}$ party 370 and the UE 302 engage in an authentication process. This process may include directing the UE 302 to connect to a specific slice for the process, or may be carried out in any number of different fashions as will be apparent to those of skill in the art. The authentication process 382 may also optionally include obtaining authorization to pay for service, or a service upgrade. Upon the completion of process 382, the $3^{rd}$ party 370 transmits an authentication response 384 to the TCSP AAF 310, which then transmits an authorization message 386 to the InP AAF 306. Messages 334 and 336 are exchanged as described above. It will be well understood that in any of the previous call flows, an inability to authenticate UE 302 could be resolved using this process. In one alternate embodiment, AP 304 or InP AAF 306 could determine that the connection request 372 did not have credentials, and as such could bypass intermediate nodes to obtain the user authentication information. It should be noted that following receipt of message 384, the TCSP AAF 310 may carry out one or both of processes 328 and 330. Following one or both of the processes, TCSP AAF 310 can transmit the authorization 386 message.

Figure 8:
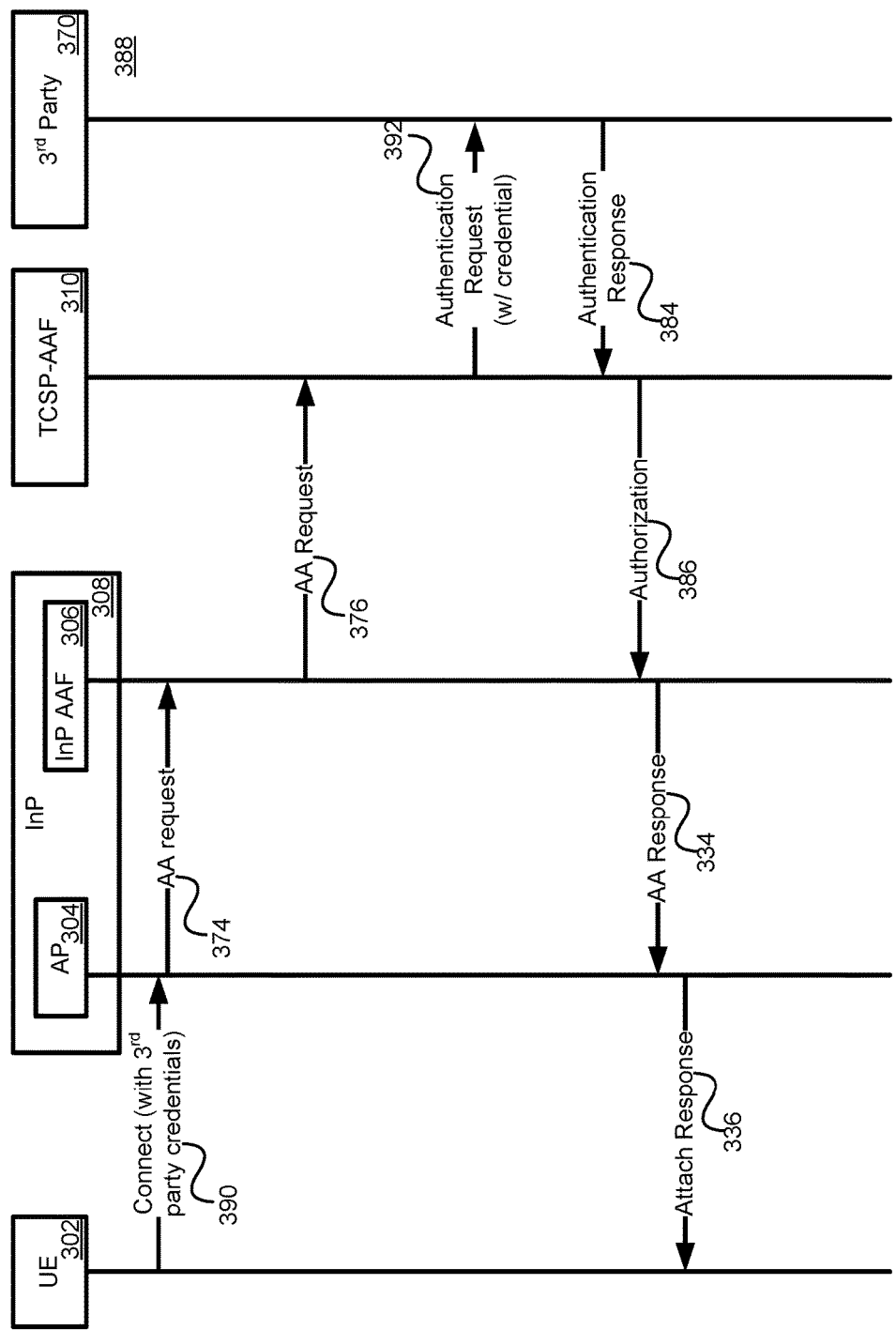
FIG. 8 illustrates a call flow according to another embodiment.

FIG. 8 illustrates an alternate process 388 in which the UE 302 transmits a connect request 390 with a set of $3^{rd}$ party credentials. These credentials may include an identification of the $3^{rd}$ party 370. AA request 374 is transmitted to InP AAF 306. Because InP AAF 306 can identify a $3^{rd}$ party credential, it knows that it cannot authenticate the UE. As such, InP AAF 306 can forward AA Request 376 without necessarily needing to perform AA process 324. Similarly, TCSP AAF 310 does not necessarily need to perform AA process 378, and can directly forward an authentication request 392 including the credentials to the third party 370. Upon authenticating the user (or the user equipment) based on the supplied credential, $3^{rd}$ party 370 can transmit authentication response 384. As described above, messages 386 334 and 336 are transmitted.

Figure 9:
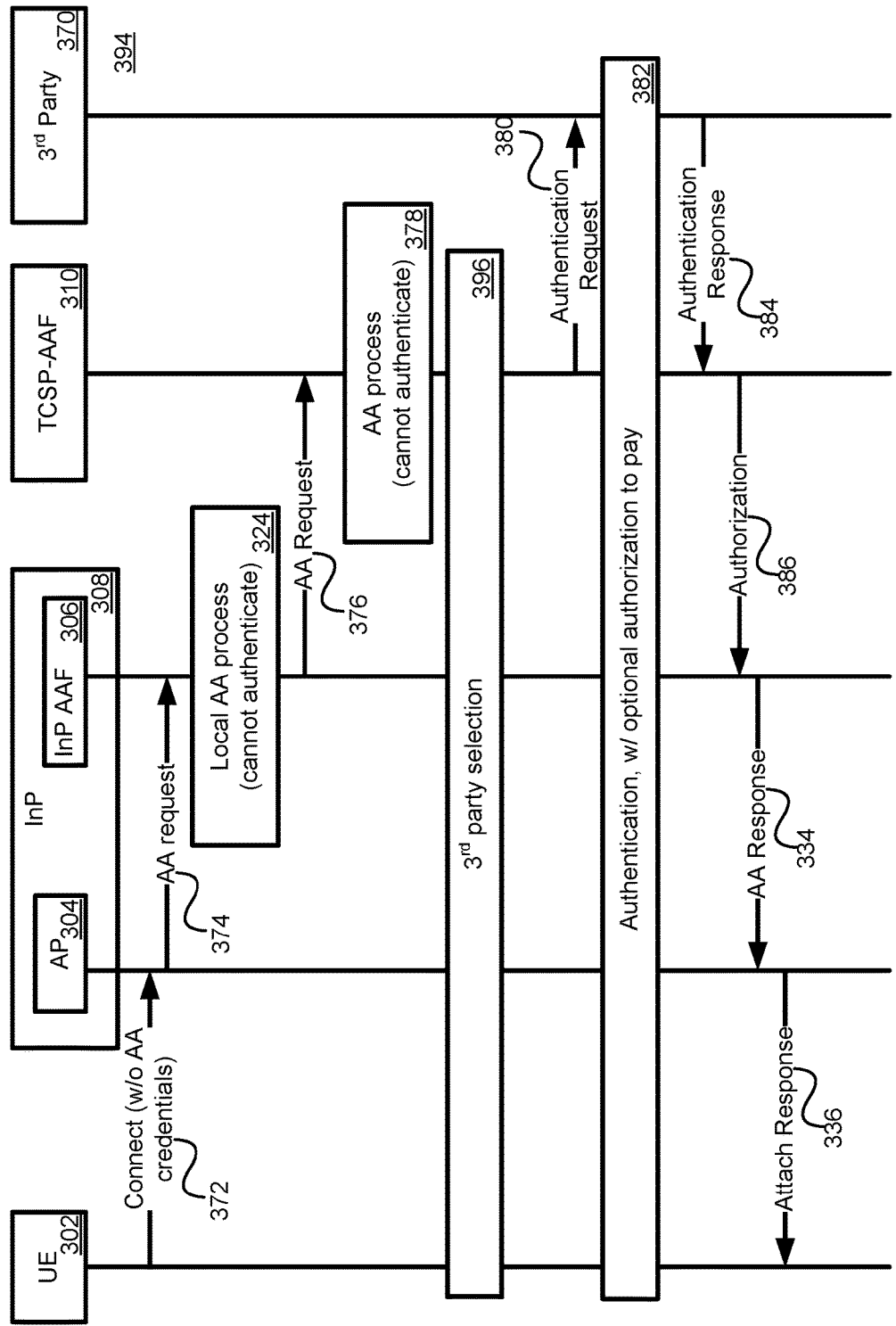
FIG. 9 illustrates a call flow according to another embodiment.

FIG. 9 illustrates a process 394 similar to the process 368 of FIG. 7. Messages and processes 372, 374, 324, 376 and 378 are carried out as described above. TCSP AAF 310 needs to determine which $3^{rd}$ party 370 is to be used for User/UE authentication. In process 396, the TCSP AAF 310 obtains from UE 302 an indication of a selected $3^{rd}$ party. This may be done by transmitting a list of available $3^{rd}$ parties to the UE 302 and awaiting a selection, or UE 302 could transmit an indication of the $3^{rd}$ parties that could provide authentication, allowing the TCSP AAF 310 to select from the list. Other variations can be supported as will be well understood by those skilled in the art. These two options are provided without the intention of being exhaustive as listing all other such options is not practical. Upon obtaining an indication of selected third party in 396, messages and processes 380, 382, 384, 386, 336 and 336 can be carried out as described above.

Figure 10:
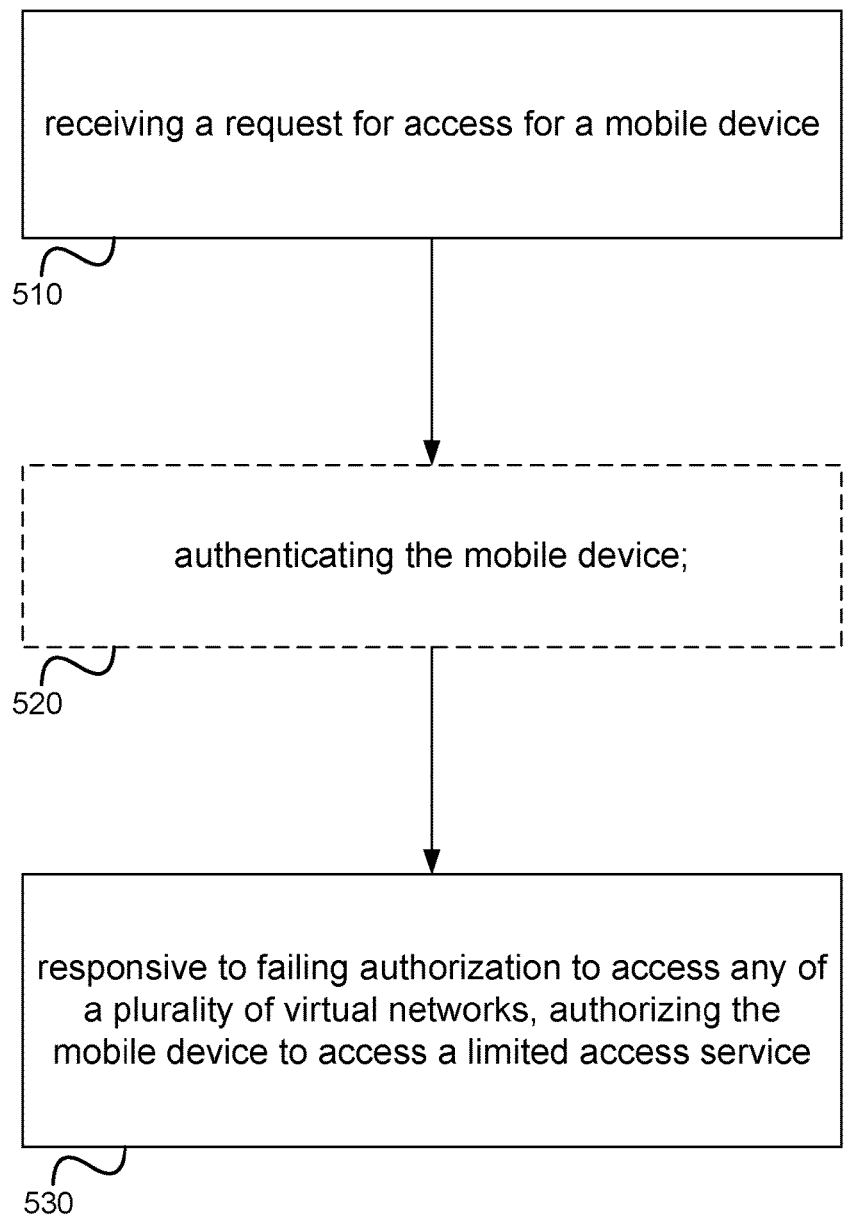
FIG. 10 is a flowchart illustrating a method according to an embodiment.

FIG. 10 is a flowchart illustrating a method of obtaining access to network resources for a mobile device according to an embodiment. Such a method includes receiving a request 510, at an authentication and authorization function (AAF) for access for a mobile device. Such a method includes at step 530, responsive to failing authorization to access any of a plurality of virtual networks, authorizing at the AAF, the mobile device to access a limited access service. In some embodiments, the method can include step 520, authenticating, at the AAF, the mobile device. Step 520 is shown in dotted line as it is optional as it can be performed by a different entity. In some embodiments authenticating 520 includes requesting and/or receiving authentication from a different entity, which can be a third party server.

Figure 11:
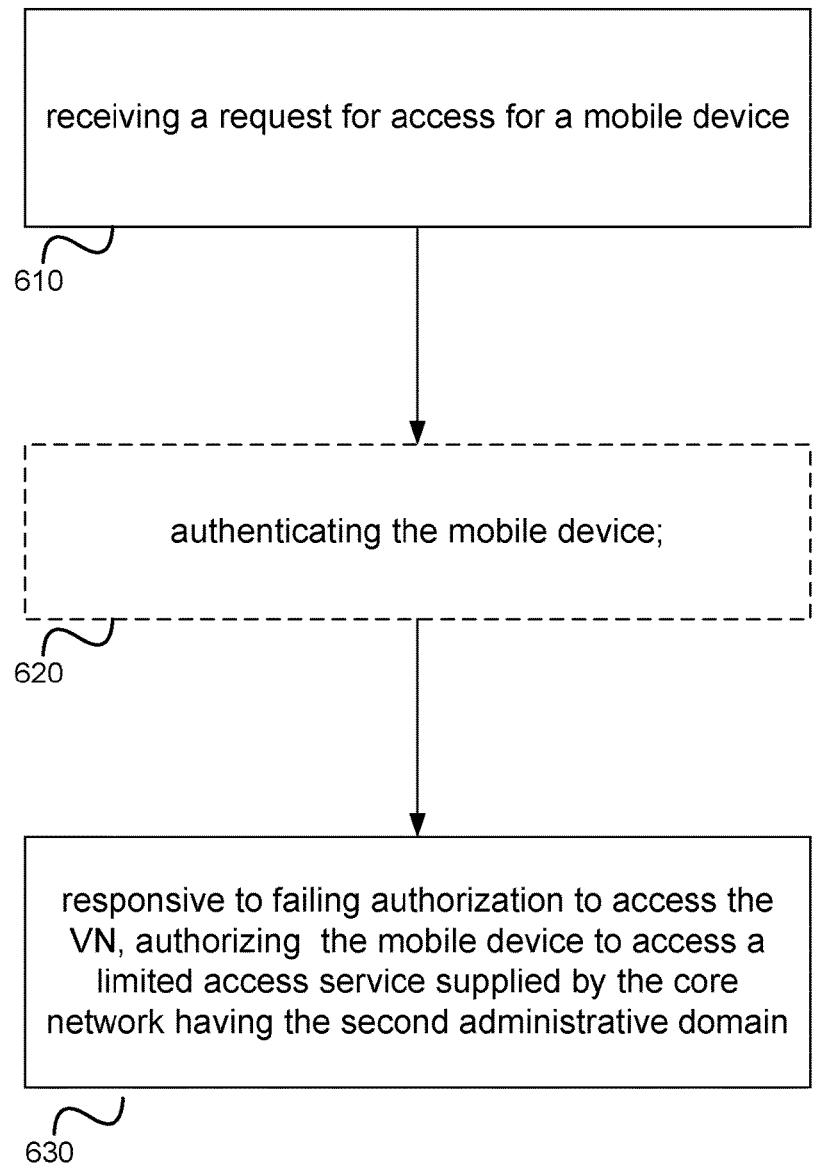
FIG. 11 is a flowchart illustrating a method according to another embodiment.

FIG. 11 is a flowchart illustrating a method of obtaining authorization for access to network resources for a mobile device in a RAN in a network architecture including the RAN having a first administrative domain, and a VN implemented using a core network having a second administrative domain according to another embodiment. Such a method is performed by an AAF. The method includes receiving 610, a request for access for a mobile device. Such a method further includes step 630, responsive to failing authorization to access the VN, authorizing, the mobile device to access a limited access service supplied by the core network having the second administrative domain. In some embodiments, the method can include at step 620 authenticating the mobile device. Step 620 is shown in dotted line as it optional as it can be performed by a different entity. In some embodiments authenticating 620 includes requesting and/or receiving authentication from a different entity, which can be a third party server.

Figure 12:
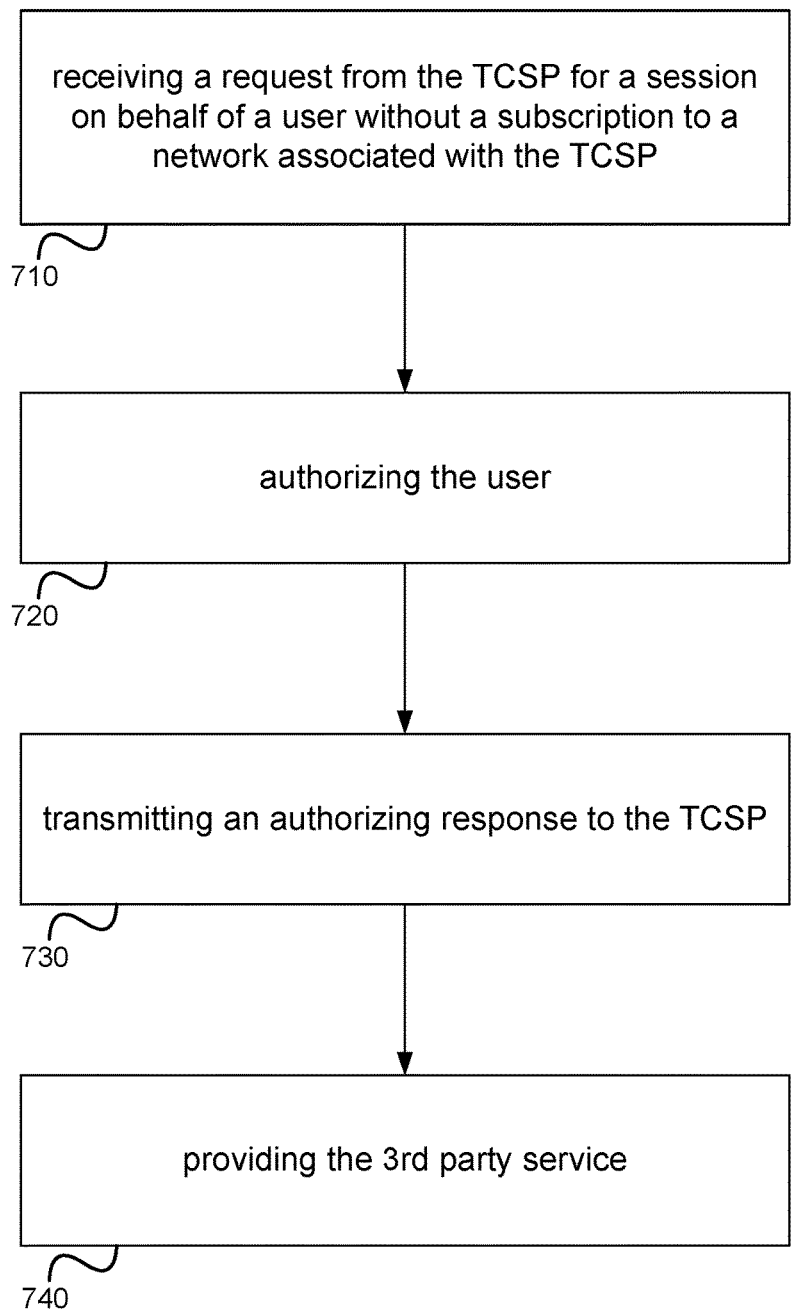
FIG. 12 is a flowchart illustrating a method according to another embodiment.

FIG. 12 is a flowchart illustrating a method of providing a 3rd party offered service via a TCSP, the method performed by a 3rd party server according to another embodiment. Such a method includes at step 710 receiving a request from the TCSP for a session on behalf of a user without a subscription to a network associated with the TCSP. Such a method further includes at step 720 authorizing the user. Such a method further includes at step 730 transmitting an authorizing response to the TCSP and at step 740 providing the 3rd party service.

Figure 13:
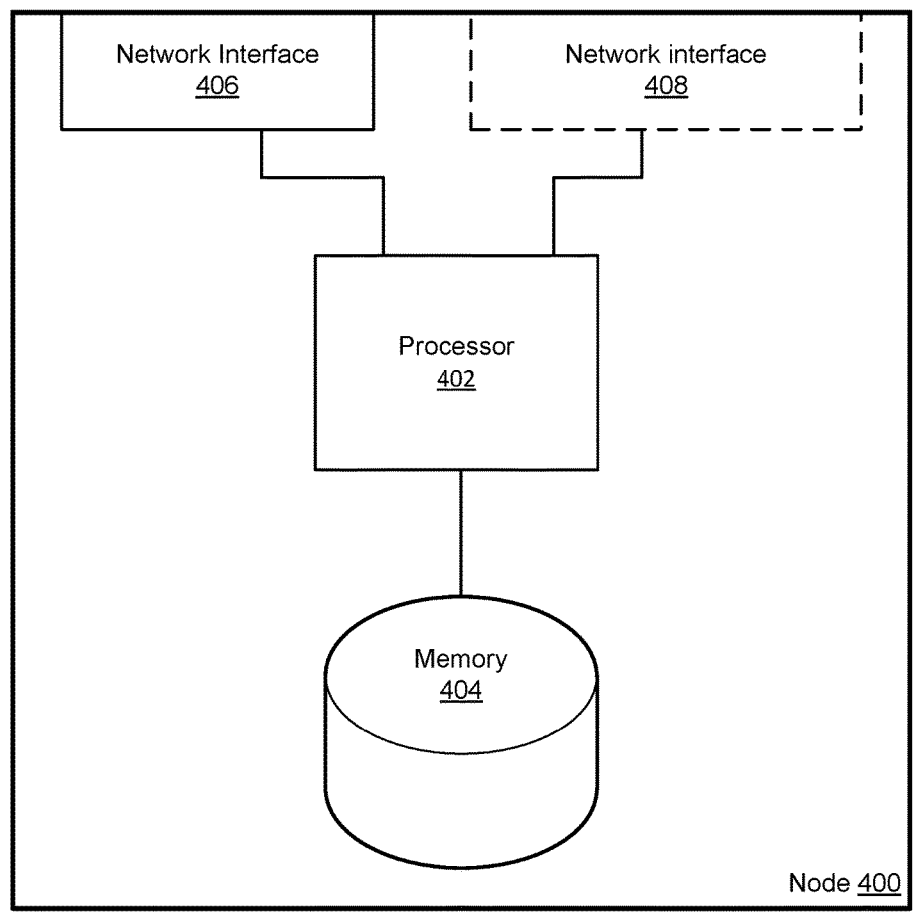
FIG. 13 illustrates a block diagram of a computing platform that can serve as a node in the above call flows, according to an embodiment.

FIG. 13 illustrates a block diagram of a computing platform that can serve as a node in the above call flows. Node 400 includes a processor 402 that can execute instructions stored in memory 404 to carry out the processes outlined above. Communication with other nodes can be carried out through network interface 406. Optional second network interface 408 can also be employed if different network interfaces are required. Those skilled in the art will appreciate that in a virtualized environment, a plurality of discrete processors may work together to execute a set of instructions stored in a commonly accessible memory. In a virtualized environment, the network interfaces 406 and 408 may not be physical interfaces if the node being communicated with resides in the same processing system, but communications with other nodes can be sent to the virtual interface which will make use of physical interface to communicate with other nodes.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be ROM, RAM, Flash memory, a compact disk read-only memory (CD-ROM), USB flash disk, a removable hard disk, or the like. The software product includes a number of instructions that enable a processor to execute the methods provided in the embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method of obtaining access to network resources for a mobile device, the method comprising:
   receiving a request, at an authentication and authorization function (AAF), from a Radio Access Network (RAN) device, for access for a mobile device;
   authenticating, at the AAF, the mobile device;
   responsive to failing authorization to access each of a plurality of virtual networks, authorizing at the AAF, the mobile device to access a limited access service;
   wherein authorizing the mobile device to access the limited access service comprises:
     requesting authorization from a blacklist authorization function; and
     transmitting an authorization message to the RAN device;
   wherein the AAF is instantiated in the core network with subscription information supplied by a virtual network operator.

2. The method of claim 1 wherein the plurality of virtual networks is established through a plurality of core networks each connected to a RAN.

3. The method of claim 1 wherein a RAN is connected to a core network, and the plurality of virtual networks are established through the core network.

4. A method of obtaining access to network resources for a mobile device, the method comprising:
   receiving a request, at an authentication and authorization function (AAF), from a Radio Access Network (RAN) device, for access for a mobile device;

authenticating, at the AAF, the mobile device;
responsive to failing authorization to access each of a plurality of virtual networks, authorizing at the AAF, the mobile device to access a limited access service;
wherein authorizing the mobile device to access the limited access service comprises:
requesting authorization from a blacklist authorization function; and
transmitting an authorization message to the RAN device
wherein the AAF is instantiated in the RAN.

5. The method of claim 4 further comprising receiving an indication of a preferred virtual network from the mobile device.

6. The method of claim 4 further comprising transmitting a list of virtual networks to the mobile device.

7. The method of claim 1 wherein the plurality of virtual networks are established through a network architecture comprising:
an infrastructure provider (InP) for providing RAN infrastructure; and
a plurality of telecommunications connectivity service providers (TCSPs) with each TCSP associated with at least one virtual network operator (VNO);
wherein a VNO supplies virtual network services to subscribing customers using a virtual network established by a TCSP.

8. The method of claim 1 wherein the plurality of virtual networks are established through a network architecture comprising:
an infrastructure provider (InP) for providing RAN infrastructure;
a telecommunications connectivity service provider (TCSP); and
a plurality of virtual network operators (VNOs);
wherein each of the VNOs supplies virtual network services to subscribing customers using a virtual network established by the TCSP.

9. The method of claim 1 wherein authenticating includes requesting authentication from a third party server.

10. The method of claim 1 wherein authorizing the mobile device to access a limited access service comprises requesting authorization for the mobile device to access a limited access.

11. The method of claim 10 wherein requesting authorization for the mobile device to access a limited access service comprises transmitting a request to a third party server.

12. The method of claim 1 further comprising:
in response to the request being a request for an emergency access service, granting access to the emergency access service;
and wherein the limited access service is a non-emergency limited access service.

13. A method of obtaining authorization for access to network resources for a mobile device in a radio access network (RAN) in a network architecture including the RAN having a first administrative domain, and a VN implemented using a core network having a second administrative domain, the method comprising:
receiving, at an authentication and authorization function (AAF), a request for access for a mobile device from a node in the first administrative domain of the RAN;
authenticating, at the AAF, the mobile device;
responsive to failing authorization to access the VN, authorizing, at the AAF, the mobile device to access a limited access service supplied by the core network having the second administrative domain;
wherein responsive to failing authorization to access the VN, authorizing the mobile device to access a limited access service comprises:
failing to authorize the mobile device for network access according to a subscriber database of the AAF;
requesting authorization from a blacklist authorization function; and
transmitting an authorization message to the RAN.

14. The method of claim 13 wherein the AAF is instantiated in the RAN with subscription information supplied by a virtual network operator.

15. The method of claim 14 wherein responsive to failing authorization to access the VN, authorizing the mobile device to access a limited access service comprises transmitting a request to a second AAF, the second AAF being located within the core network, and receiving a reply from the second AAF.

16. The method of claim 13 wherein the AAF is instantiated in the core network.

17. A method of providing a third party offered service via a telecommunications connectivity service provider (TCSP), the method comprising:
receiving, at a third party server, a request from the TCSP for a communication session on behalf of a user without a subscription to a network associated with the TCSP;
requesting authorization, by the third party server, on behalf of the user from a blacklist authorization function;
transmitting, from the third party server, an authorizing response to the TCSP; and
providing, by the third party server, the third party service using the communication session.

18. The method of providing a third party offered service as claimed in claim 17 further comprising transmitting a message to the TCSP indicating the third party agrees to pay for connection charges.

19. The method of providing a third party offered service as claimed in claim 18 further comprising negotiating with the TCSP for specific connection parameters for the session.

20. A node comprising:
a processor;
machine readable memory storing machine executable instructions for implementing an authentication and authorization function (AAF) comprising instructions to cause the AAF to:
receive a request, from a Radio Access Network (RAN) device, for access for a mobile device;
authenticate the mobile device; and
responsive to failing authorization to access each of a plurality of virtual networks, authorize the mobile device to access a limited access service;
wherein authorizing the mobile device to access the limited access service comprises:
requesting authorization from a blacklist authorization function; and
transmitting an authorization message to the RAN device
wherein the AAF is instantiated in the core network with subscription information supplied by a virtual network operator.

21. A node for use in a network, the network including a Radio Access Network (RAN) having a first administrative domain and a VN implemented using a core network having a second administrative domain, the node comprising:
  a processor;
  machine readable memory storing machine executable instructions for implementing an authentication and authorization function (AAF) comprising instructions to cause the AAF to:
    receive a request for access for a mobile device from a node in the first administrative domain of the RAN;
    authenticate the mobile device;
    responsive to failing authorization to access the VN, authorize the mobile device to access a limited access service supplied by the core network having the second administrative domain;
    wherein responsive to failing authorization to access the VN, authorizing the mobile device to access a limited access service comprises:
    failing to authorize the mobile device for network access according to a subscriber database of the AAF;
    requesting authorization from a blacklist authorization function; and
    transmitting an authorization message to the RAN.

* * * * *

UNITED STATES PATENT AND TRADEMARK OFFICE
CERTIFICATE OF CORRECTION

PATENT NO. : 10,298,580 B2
APPLICATION NO. : 15/169097
DATED : May 21, 2019
INVENTOR(S) : Nimal Gamini Senarath et al.

Page 1 of 1

It is certified that error appears in the above-identified patent and that said Letters Patent is hereby corrected as shown below:

In the Specification

In the Background:

Column 1, Line 20:
"compliant with the Long Term Evolution (LIE) standards,"

Should read:
--compliant with the Long Term Evolution (LTE) standards,--

Signed and Sealed this
Second Day of June, 2020

Andrei Iancu
*Director of the United States Patent and Trademark Office*